United States Patent [19]

Schmidt

[11] 4,148,276
[45] Apr. 10, 1979

[54] BROILER BATTERIES

[75] Inventor: Albert Schmidt, Ankum, Fed. Rep. of Germany

[73] Assignee: Schmidt-Ankum Agrar- und Zwecksbau, Ankum, Fed. Rep. of Germany

[21] Appl. No.: 746,309

[22] Filed: Dec. 1, 1976

[30] Foreign Application Priority Data

Dec. 5, 1975 [DE] Fed. Rep. of Germany ....... 2555357

[51] Int. Cl.² ..................... A01K 31/04; A01K 31/06
[52] U.S. Cl. ...................................... 119/18; 119/21; 119/22
[58] Field of Search ................. 119/18, 21, 22, 12, 119/72, 72.5, 82

[56] References Cited

U.S. PATENT DOCUMENTS

| | | | |
|---|---|---|---|
| 2,604,874 | 7/1952 | Forbes et al. | 119/21 X |
| 2,828,717 | 4/1958 | Mikkelsen | 119/18 X |
| 3,173,564 | 3/1965 | Mayo | 119/12 X |
| 3,810,444 | 5/1974 | Conley | 119/22 |
| 3,900,006 | 8/1975 | Shockley, Jr. | 119/18 |
| 3,916,835 | 11/1975 | Reynolds | 119/82 |

Primary Examiner—Hugh R. Chamblee

[57] ABSTRACT

Unitary spaces each having a floor defined by a perforated portion and a drive pulley for the cable portion of the loop. The loop is driven in reverse directions to move the belt portion between its floor forming position and an inverted position for cleaning. The belt portion carries a vertical rear end wall of the broiler quarters, disposed transversely of the belt. The side walls and the front end wall of the quarters are mounted on the frame. The belt portion extends round the guide roller to form a table section immediately to the outside of the front end wall position. To extract broilers from the battery, the front end wall is removed and the loop is driven so as gently to transport the broilers out onto the table section from which they are transferred onto a transverse conveyor almost at the same height. To install chicks, these are placed on the same table section, the loop being driven in the reverse direction so as to carry the chicks into the broiler quarters. The birds' droppings fall away through the perforations in the floor which remains stationary during the rearing and fattening process. The birds therefore remain cleaner and healthier than when made to rest on dried droppings which form pressure points creating breast blisters when the birds are fat.

23 Claims, 8 Drawing Figures

BROILER BATTERIES

BACKGROUND OF THE INVENTION

The present invention relates to broiler batteries for rearing broilers.

It is known to provide a broiler battery having a stationary, elongated frame and a floor for the broilers which is formed by the upper run of an endless conveyor belt supported for longitudinal movement in the frame. The belt is deflected around a guide roller at each end of the frame and at least one of these guide rollers is continuously driven so as to move the conveyor belt. As will be appreciated, the length of the belt, composed of its upper and lower runs, is approximately double the length of the floor for the broilers formed by its upper run. In the region of one of the guide rollers, a rotary wire brush is provided which is in turn driven so as to brush the outside of the continuously rotating conveyor belt to cleanse it of dried droppings and other contaminants, which are then removed from the battery via a chute. The brush is positioned so as to brush the upper run of the belt at the beginning of the upper run. The droppings deposited by the birds on the upper run have to move the full length of the run and then back again along the lower run, before being brushed off. Since the speed of rotation of the conveyor belt is made very slow, e.g. 2 meters per hour, so as to avoid any risk of damaging the birds in the battery, this means that, with a conventional battery length of say 60 to 70 meters, the birds' droppings remain on the floor of the battery for one to one and a half days. This impairs the rearing of broilers, particularly towards the end of a fattening period, because then the broilers frequently rest with their breasts on the floor and deposits of droppings which have dried form pressure points which can be responsible for the development of breast blisters. Also, fresh deposits of droppings may lead to considerable contamination of the broilers during this period and this increases the risk of infection spreading among them. Another disadvantage is that the movement of the conveyor belt forces the birds to keep on the run, which interferes with the fattening of the broilers.

In the known battery, the installation of the chicks into the battery is effected by placing them on the upper run of the conveyor belt as it enters the battery, while, in order to remove the birds, a separate, vertical driving wall is mounted on the upper run of the conveyor belt so as to travel with the conveyor belt and push the birds out of the battery onto trap doors at the discharge end. The weight of the birds then deflect the doors downwards and the birds fall, via a chute, onto a further conveyor belt which conveys them away for slaughter. There is a risk of injury to heavy and awkward broilers as they fall through the trap doors onto the further conveyor belt.

SUMMARY OF THE INVENTION

The present invention provides a broiler battery in which the floor for the broilers is formed by a perforated belt portion of an endless loop dispersed above a manure channel which collects droppings falling through the perforations. The length of the perforated belt portion is made only a little longer than the required floor for the broilers and its ends are suitably connected together e.g. by a cable which completes the remainder of the endless loop. The endless loop passes over rotatable guides at each end one at least of which is drivable to move the perforated belt portion of the loop from its floor forming position in the upper run of the loop into an inverted position in the lower run of the loop. During rearing of the broilers, the perforated belt portion forming the floor for the broilers, remains stationary. In order to remove the birds from the battery at the end of the fattening period, and in order also to install fresh birds, the perforated belt portion is moved to its inverted position and thereafter returned to its floor forming position respectively.

During rearing, the droppings of the birds mainly fall away, directly through the perforations in the floor into the manure channel.

The manure channel may be positioned below the lower run of the endless loop and this is made possible where the lower run of the loop is composed by a cable which allows droppings to reach a manure channel below the level of the cable substantially unhindered.

In its broiler floor forming position therefore, the perforated belt portion is kept relatively free of droppings from the birds so that the broilers can be reared more hygienically with less risk of the formation of breast blisters.

Since the perforated belt portion remains stationary in its broiler floor forming position during the whole of the fattening period, no movement is imposed on the birds which hampers the fattening process.

A battery according to the present invention can be operated with negligibly low energy comsumption and wear because the endless loop remains mainly stationary and is driven only to install and remove the birds from the battery.

Removal of broilers at the end of the fattening period, by moving the perforated belt portion, may be carried out simply and without risk of injury to the birds. As the perforated belt portion passes downwardly over the guide roller at one end of the endless loop, into its inverted position, the birds are moved progressively, and without force, out of the broiler quarters and may be transferred, for example, to a transverse conveyor at substantially the same height as the broiler floor.

The perforated belt portion may be supported, both in its broiler floor forming position and in its inverted position, on guide rails which are mounted on a frame and which are connected to one another by arcuate guide rail portions at one end for guiding the perforated belt portion between its floor forming and inverted positions. With this arrangement, the endless loop is driven in reverse directions to move the perforated belt portion between its floor forming and inverted positions.

A vertical, transverse, terminal end grating may be provided rigidly connected to one end of the perforated belt portion to be movable with the endless loop between fixed, longitudinally extending front and rear gratings as the endless loop is driven to remove the birds. Thus, a separate driving wall for removing the broilers from their quarters is unnecessary.

A transverse, vertical, leading end grating completes the broiler quarters. This is removably attached to the battery frame at the end adjacent the arcuate guide rail portions.

The endless loop may be guided and driven around a freely rotatable guide roller mounted on the frame between the arcuate guide rail portions and a drive pulley at the opposite end of the frame. Such a pulley may be fixed to a shaft which is connected to be driven by a reversible motor. The drive pulley guides and drives a cable portion of the endless loop and the roller simply guides the perforated belt portion of the loop.

The cable portion may advantageously be provided with a cable tightener to regulate the longitudinal tension in the floor forming perforated belt portion of the loop.

In order to support the perforated belt portion of the loop, this may be provided with spaced, transverse pockets inside the loop which pockets receive transverse rods the ends of which project from the pockets and therefore from the corresponding longitudinal edges of the perforated belt portion, to carry freely rotatable rollers which are guided and supported on the guide rails already mentioned. The transverse rods received in the transverse pockets act to stiffen and support the perforated belt portion transversely between the guide rails.

Suitably, the perforated belt portion is formed from a plastics fabric material, for example, a polyamide fabric. The belt portion is provided with rows of holes of about 15 mm in diameter the holes being spaced apart by about 8 mm in the rows and the rows of holes being correspondingly spaced. Such a perforated belt portion affords optimum characteristics for the birds to lay down on and stand up on, whilst ensuring that the majority of droppings fall through the holes.

BRIEF DESCRIPTION OF THE DRAWING

Other features and advantages of the present invention will become apparent from a consideration of the following description of one specific embodiment thereof given by way of example and not by way of limitation with reference to the accompanying drawings in which.

DETAILED DESCRIPTION

Figure 1:
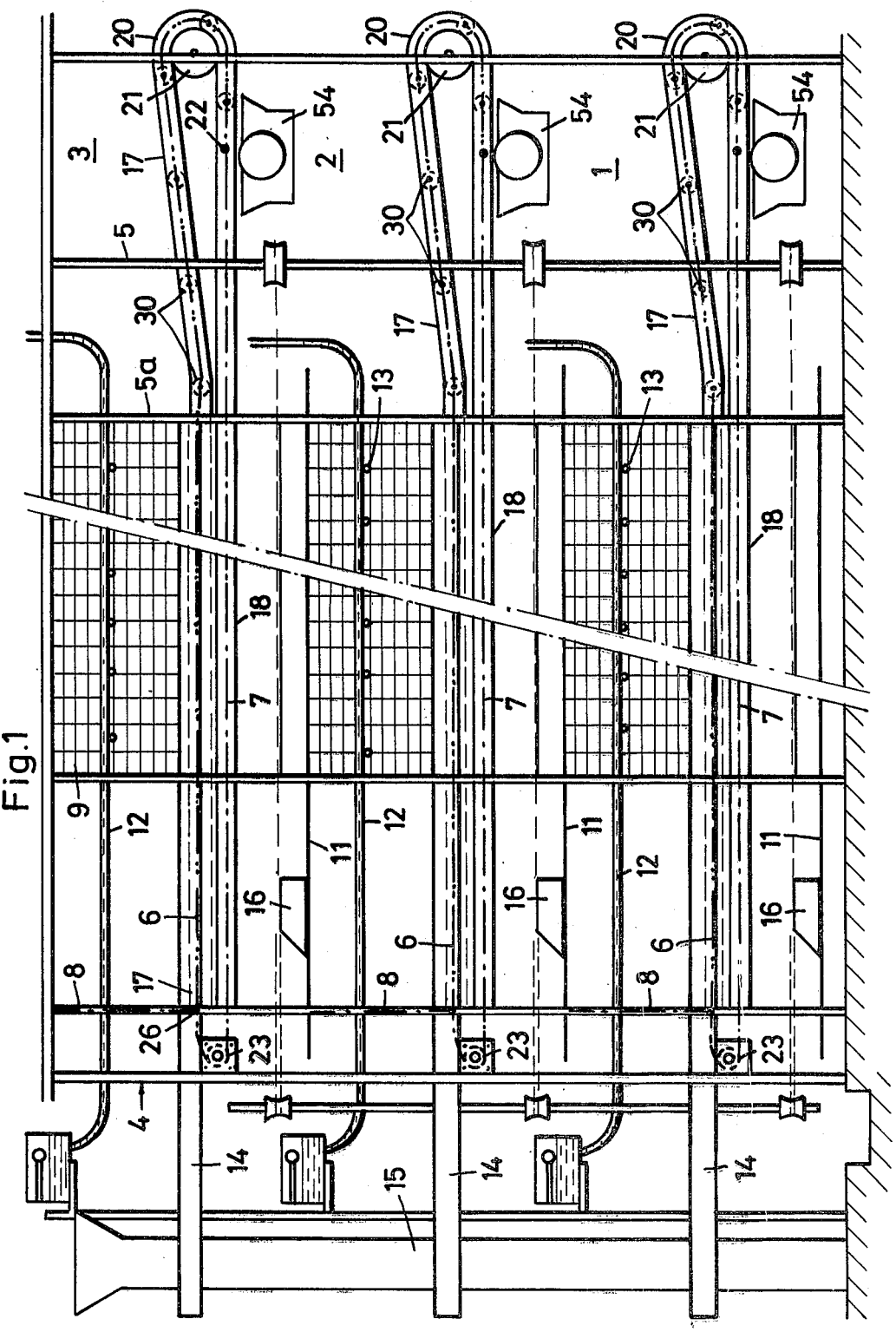
FIG. 1 shows a longitudinal side view of a three tier broiler battery in accordance with the present invention.

With reference now to the accompanying drawings, the three tiers of the battery are indicated respectively at 1, 2 and 3. As will be appreciated, a lesser or greater number of tiers may be provided, including only one tier if desired. The battery comprises a stationary, elongated frame which is designated as a whole by the reference numeral 4 and which is formed in any convenient or conventional manner from suitably spaced vertical uprights indicated generally by the reference numeral 5, connected by appropriately positioned longitudinal and transverse frame members disposed horizontally.

Each tier 1, 2 and 3 of the battery comprises broiler quarters defined in a unitary space having a floor for the broilers contained in that space which floor is formed by a perforated belt portion 6 of an endless loop. The portion 6 of the endless loop is illustrated in FIG. 1 by a chain dotted line in which the dots are grouped in pairs. The battery has a length of about 60 to 70 meters and only two end portions respectively of the battery are shown in FIG. 1. Each perforated belt portion 6 is a little longer than is necessary to floor each of the broiler quarters, as will hereinafter appear. The two ends of each perforated belt portion 6 are interconnected to form an endless loop by a cable 7. These cables 7 are illustrated by chain dotted lines in which the single dots only are used.

Figure 7:
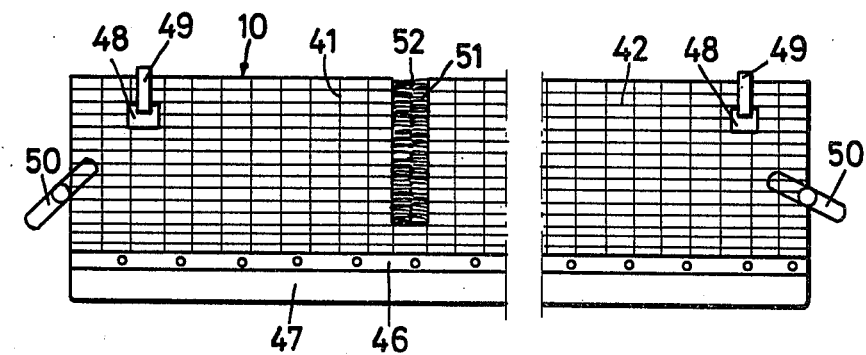
FIG. 7 is a front view of the leading end grating which is mounted on the frame of the battery in each tier.

Rigidly connected to each perforated belt portion 6 is a transverse, vertical rear end grating 8 which is likewise illustrated in FIG. 1 by a chain line interrupted by groups of two dots and which together with longitudinal front and rear gratings 9 fixed to the frame 4 and a transverse, vertical front end grating 10 (see FIGS. 4 and 7) removably attached to a pair of uprights 5a of the frame 4, laterally bound the broiler quarters in each tier.

In the tiers 1 and 2, the manure channels 11 associated with tiers 2 and 3 respectively, also form the boundary of the broiler quarters of the tier at the top. In tier 3, the boundary of the broiler quarters at the top is formed by a separate cover grating attached to the frame 4.

Extending through the broiler quarters above the perforated belt portion 6 in each tier, is a drinking water supply pipe 12 with drinking water extraction nipples 13. Food troughs 14, which are arranged to be charged from a common food shaft 15, extend along the two longitudinal side edges of the frame 4 in each tier. Manure channel scrapers 16 are provided one associated with each manure channel 11. The scrapers 16 have chain drives indicated by broken lines in FIG. 1, passing around guide pulleys one at each end of the battery, these guide pulleys, at one end, being mounted on a common drive shaft drivable in reverse directions to move the scrapers 16 along the manure channels to scrape them clean and thereafter to return the scrapers to their starting position.

In addition to its floor forming position, each perforated belt portion 6 also has an inverted position situated below the plane of its floor forming position, into which it can be displaced by deflection around a guide roller at one end of the frame 4 and from which it can be moved back again into its floor forming position by movement in the opposite direction around the guide roller. Thus, in the inverted position, in comparison with its illustrated position in FIG. 1, the positional plane of each perforated belt portion 6 is that of its associated cable 7 and vice versa.

In the example illustrated, the perforated belt portions 6 are formed from a polyamide fabric material having a high tensile strength. For the satisfactory passage of droppings, each perforated belt portion 6 has punched holes with a diameter of about 15 mm, which are disposed in transverse rows, the holes and rows being spaced apart by about 8 mm. In each tier 1 to 3 of the battery, the perforated belt portion 6 is supported, in its floor forming position, by upper guide rails 17 and in its inverted position by lower guide rails 18. The guide rails 17 and 18 extend in the longitudinal direction of the frame 4 and are secured to the frame by means of brackets 19 (see FIG. 3). At the right hand end of the frame 4 in FIG. 1 the guide rails 17 and 18 are each connected to one another by an arcuate guide rail 20. Mounted on the frame 4, concentrically with the arcuate guide rails 20 of each tier 1 to 3, is a freely rotatable guide roller 21. When the belt portion 6 is in its floor forming position the belt portion extends a short distance around the roller 21 into the plane of the cable 7, the belt portion being connected to the cable as at 22 at its end adjacent the roller 21. In the opposite end region of the frame, remote from the guide rollers 21, in each tier, a cable guide pulley 23 is fixed to a shaft 24 which can be driven by means of a reversible motor 25, preferably a geared motor, in either direction. Each pulley 23 guides its associated cable 7 which is in turn rigidly connected, as at 26, to the end of the perforated belt portion 6 carrying the rear end grating 8. The cable 7 is provided with a turn buckle (not illustrated) which may be adjusted to regulate the tension in the cable and therefore the longitudinal tension in the belt portion 6. Thus, by tightening the cable, the belt portion 6 may be tightened if the weight of the broilers should cause the belt portion to sag unduly.

Figure 4:
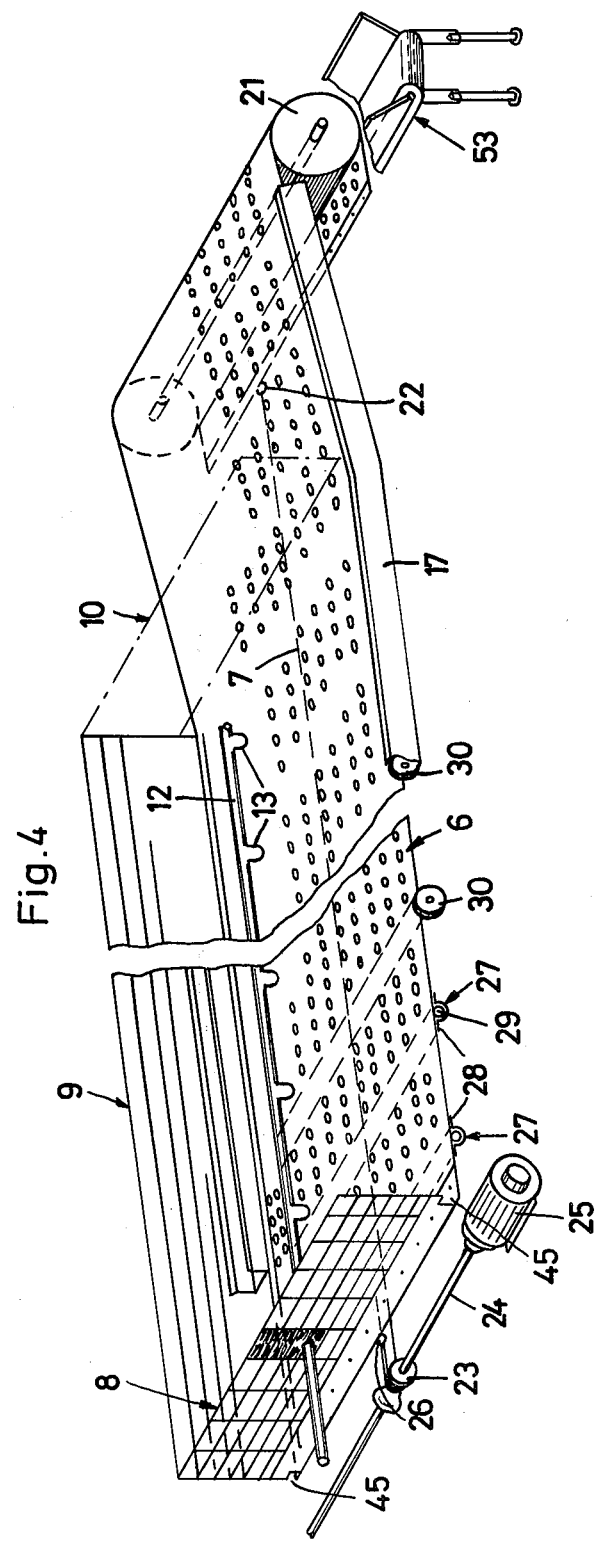
FIG. 4 is a perspective illustration of the perforated belt portion of the endless loop in one tier of the battery and showing also adjacent parts of the battery.

As FIG. 4 shows, a leading end section of the perforated belt portion 6 extends under the front end grating 10, this leading end section rising gently along the upper guide rail 17 to the guide roller 21. This section of the perforated belt portion 6 forms a table for loading chicks into the battery tier and for removing broilers from the battery tier at the end of the production process.

As can further be seen from FIG. 4, each perforated belt portion 6 is provided with transverse pockets 27 disposed inside the loop 6, 7 formed by the perforated belt portion 6 and the cable 7. These pockets are disposed at suitable spacing e.g. 50 cm measured in the longitudinal direction of the belt portion. The transverse pockets 27 extend over the whole width of the perforated belt portion 6. The pockets have marginal flanges 28 by means of which the pockets are firmly attached to the perforated belt portion 6 in non-perforated regions of the belt portion. These non-perforated regions of the belt portion have longitudinal and transverse dimensions corresponding to the pockets 27 and marginal flanges 28, the dimensions between the free edges of the two flanges 28 associated with each pocket 27 being for example, 6 cm.

Together with the perforated belt portion 6, the transverse pockets 27 form sleeves housing rods 29 which project from the two ends of the pockets and accordingly the two longitudinal side edges of the perforated belt portion 6 to carry, at their two ends respectively, freely rotatable rollers 30 which are guided and supported on the guide rails 17 and 18. The transverse pockets 27 containing the transverse rods 29 impart the necessary stiffness to the perforated belt portion 6 transversely of its length.

Figure 3:
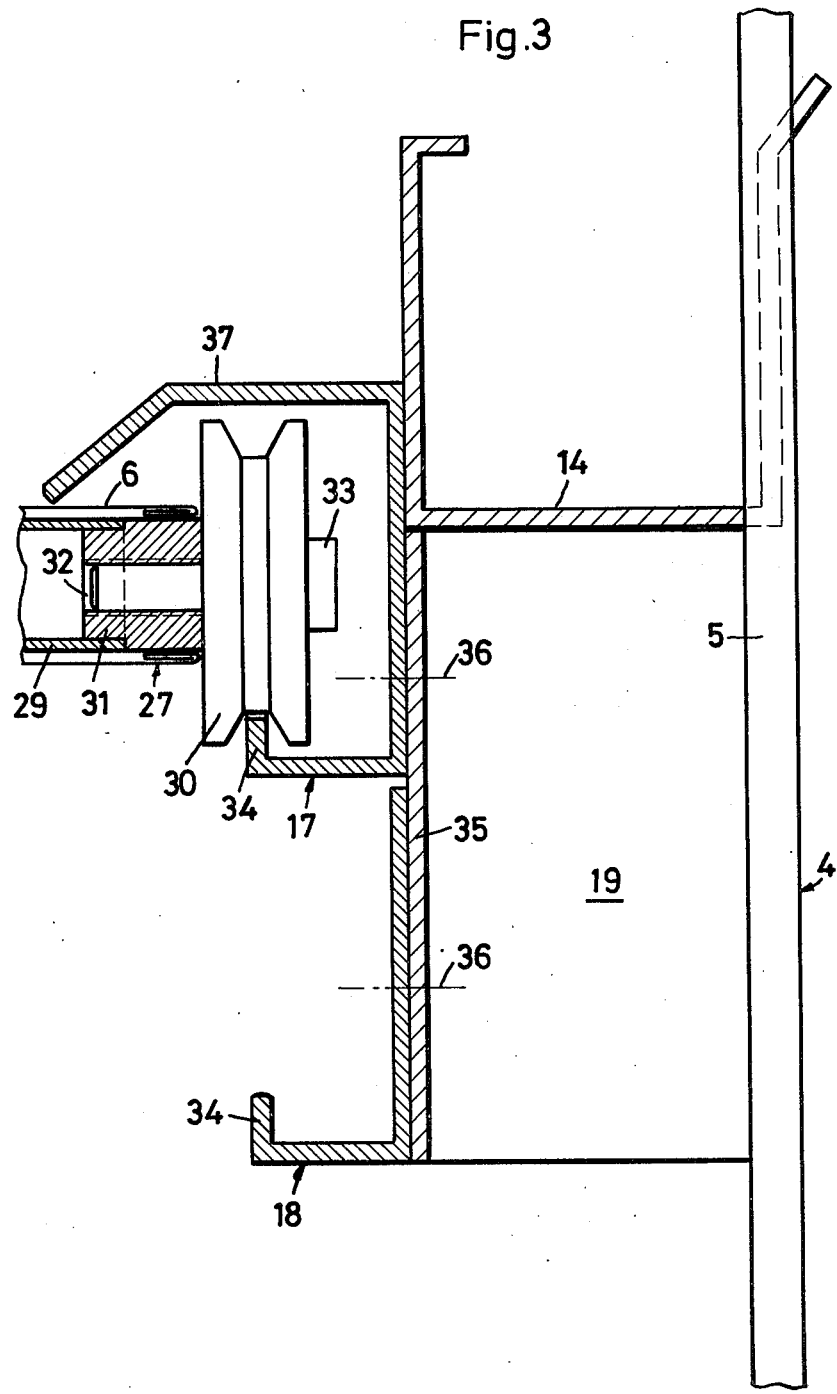
FIG. 3 shows a detail of FIG. 2 to a larger size.

In the example illustrated, as can be seen from FIG. 3, each transverse rod 29 is tubular and has its ends closed by stoppers 31 inserted into the tube ends. Each stopper furthermore bears with a shoulder against the respective end of the tube. The stoppers 31 are provided with capped bores 32 into which threaded portions of headed spindles 33 are screwed. Each roller 30 is mounted for free rotation on a projecting portion of a spindle 33 which has no thread so as to be held in place between the stopper and the spindle head. The perforated belt portion 6 has unperforated longitudinal edge portions which are folded inwardly and form hems at the longitudinal edges of the belt portion for strengthening purposes. These hems lie close to the inside faces of the rollers 30 and engage over the projecting heads of the stoppers 31 at the opposite ends of the pockets.

Figure 2:
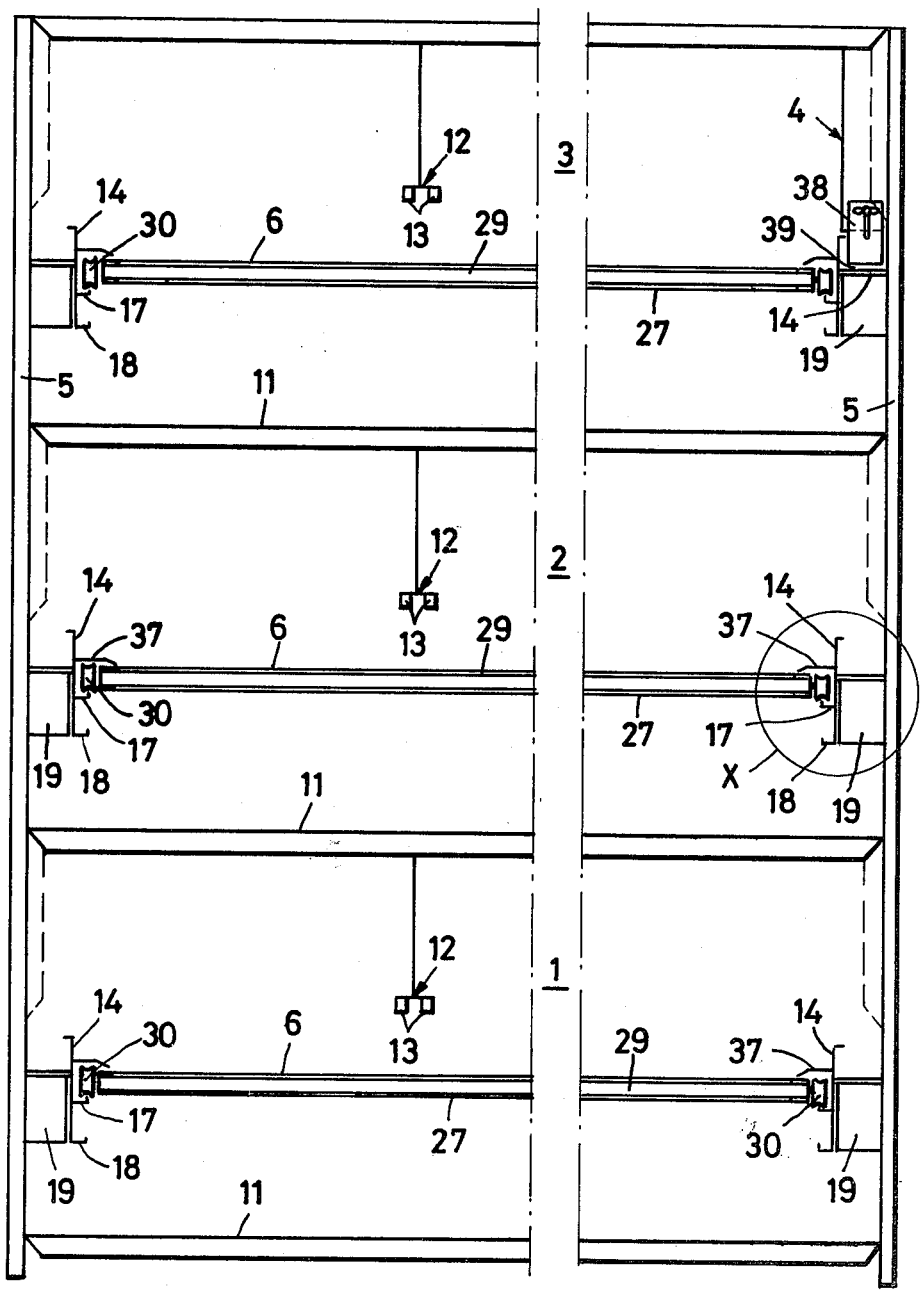
FIG. 2 is a cross-section of the battery shown in FIG. 1.

In the example illustrated, the guide rollers 30 are flanged rollers having side flanges which locate against vertically extending portions 34 of the guide rails 17 and 18. The brackets 19 are of angle section with one arm bolted to a vertical upright 5 or 5a of the frame 4, the other arm 35 of each bracket being bolted to the guide rails 17 and 18, as at 36. At the same time, the brackets 19 support the food troughs 14 underneath. The upper guide rails 17 are formed integrally each with a cover 37 which engages over the rollers 30 and extends downwardly directly to the plane of the floor provided by the perforated belt portion 6. These covers protect the broilers from the rollers and also the rollers from being soiled by droppings and residues of food fed to the broilers. The covers 37 may, instead, be formed with or be carried by the food troughs 14, in which case the guide rails 17 and 18 may be formed from the same stock. If the covers 37 are on the troughs 14 the rollers 30 are made accessible by removal of the troughs. As illustrated on the right hand side of FIG. 2, for the tier 3 of the battery, each food trough 14 has shut off plates 38 one at each end. The plates 38 are mounted for adjustment in height on the frame 4, leaving a gap 39 for an endless food conveying chain which slides along the floor of the trough. This shutting off of the ends of the food troughs is necessary with freshly installed chicks to prevent them escaping from the battery through the food channel supply or the food troughs 14. As soon as the broilers have reached a certain size, it is unnecessary to keep the shut off plates 38 in their stop position and they may be raised particularly at the inlet end to allow more food to be fed into the troughs as is appropriate to the growth of the chicks.

Figure 5:
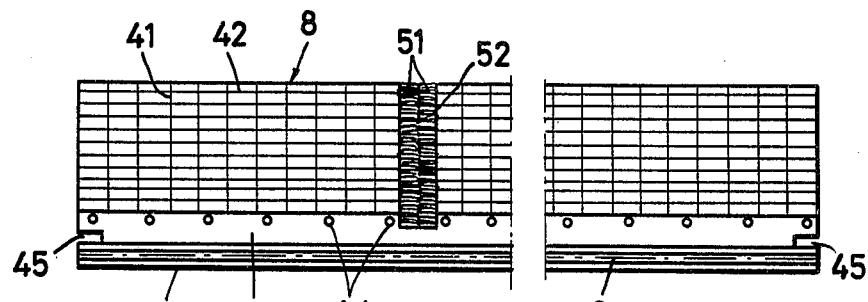
FIG. 5 is a front view of the rear end grating which is fixed to the perforated belt portion in each tier of the battery.
Figure 6:
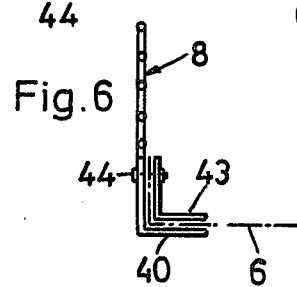
FIG. 6 is a vertical cross-section through the rear end grating of FIG. 5.

As can be seen in particular from FIGS. 5 and 6, each end grating 8 is formed from vertical and horizontal grating members 41 and 42. A holding bar 40 which is L-shaped in cross-section carries the grating and a further holding bar 43, which is likewise made L-shaped in cross-section, is screwed by its vertical limb to the vertical limb of the holding bar 40, the holding bars receiving and locating between them the end of the perforated belt portion 6, as illustrated at 44. In order that the grating 8, which has the same width as the perforated belt portion 6, may be able to move over the covers 37 of the rollers 30 during the displacement of the belt portion 6 into its inverted position or during its return movement out of the inverted position into its broiler floor forming position, it has lateral recesses 45 at both sides adjacent the plane of the belt portion 6 and the horizontal limb of the holding bar 43.

Figure 8:
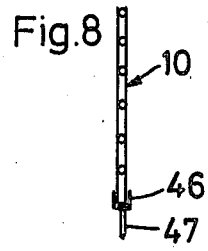
FIG. 8 is a vertical cross-section through the front end grating of FIG. 7.

Each front end grating 10 is composed of vertical and horizontal grating members 41 and 42 disposed in the vertical plane of the pair of uprights 5a and the food troughs 14, originating from the food shaft 15, also end in this plane. As can be seen from FIGS. 7 and 8 each grating 10 also comprises a U-section bar 46 along its bottom edge and this bar carries a lip of rubber or the like resilient material which projects downwardly from the bar and fits snugly, with resilient deformation, against the top of the covers 37 and against the perforated belt portion 6 in the broiler floor forming position of the belt portion. Each grating 10 has two apertures 48 towards its top and side edges each aperture to receive a hook 49 which is fixed on the frame 4. Thus, each grating 10 is suspended on the frame on a pair of hooks 49 engaged each through one of the apertures 48 when the perforated belt portion is in its floor forming position. Each grating 10 is further secured in position by means of a pair of toggle buttons 50 pivotally mounted on the frame 4.

The end gratings 8 each also comprise two vertically disposed combs having oppositely directed horizontal teeth composed of rubber or the like resilient material these combs define gaps 52 for drinking water supply pipe 12, the gaps being aligned in the longitudinal direction disposed in a vertical plane parallel with the side gratings 9. The rubber teeth 51 resiliently close the gaps 52 to prevent the escape of chicks through the gaps but at the same time they provide through ways for the drinking water supply pipe 12 and at the same time also they permit the height adjustment of this drinking water supply pipe in accordance with the growth of the chicks.

The broilers, which are installed in each tier 1 to 3 as chicks, remain there during the whole fattening period. The floor forming portion 6 of the broiler quarters in each tier remains stationary in its floor forming position. At the termination of the fattening period, in each tier 1 to 3 of the battery, the front end grating 10 is removed from the frame 4 and the motor 24 is switched on. The belt portion 6 forming the floor is then moved around its guide roller 21 in the clockwise direction, its leading edge travelling towards the cable pulley 23. By this means, the broilers are moved gently out of their quarters and may be transferred from the removal table formed by the gently rising section of the perforated belt portion 6 just in front of the guide roller 21 onto a transverse conveyor 53 (see FIG. 4), which conveys them from away for slaughter. The broilers have no possibility of leaving the broiler quarters through the rear end because the end grating 8 travels with the perforated belt portion 6. When the perforated belt portion 6 reaches its inverted position, the motor 25 is switched off again, for example by means of a limit switch which operates automatically. Then the battery is cleaned and disinfected in the usual manner. The cleaning and disinfecting device 54 for the perforated belt portions 6 can be disposed below the plane of each perforated belt portion which it assumes in its inverted position. Conveniently, the devices 54 are situated in the region adjacent the guide rollers 21. These devices 54 comprise a rotary wire brush which is driven in engagement with the outside of the perforated belt portion as it is moved to its inverted position, the brush acting to clean the belt portion and apply disinfectant to it.

To install chicks, these are placed on the loading table formed by the gently rising perforated belt portion 6 adjacent the guide roller 21 and for this purpose the perforated belt portion 6 has a length such that even in its inverted position it can form this table in the region between the guide roller 21 and the vertical plane of the uprights 5a which normally carry the front end grating 10. The motor 25 is switched on in the reverse direction for a return movement of the perforated belt portion 6. The belt portion runs round the guide roller 21 in counterclockwise direction, as a result of which the chicks are progressively carried into the broiler quarters. At the end of the installation process the motor 25 is again switched off, for example automatically by a limit switch, and the front end grating 10 is suspended on the frame 4 on its hooks and secured in position by its toggle buttons 50.

Even in a multi-tier battery, as in the example illustrated, only one horizontal transverse conveyor 53 need be provided at the broiler discharge end of the frame 4. This conveyor is supported on the floor and is adjustable in height so that it can be positioned selectively adjacent the roller 21 of any one of the tiers 1 to 3.

Although the invention is illustrated and described with reference to one preferred embodiment thereof, it is to be expressly understood that it is in no way limited to the disclosure of such a preferred embodiment, but is capable of numerous modifications within the scope of the appended claims.

I claim:

1. A battery for rearing broilers, comprisng in combination,
    a frame having opposite side walls and a front end movable wall attached to said frame and in part defining a unitary space for housing broilers;
    flexible floor means disposed in the bottom of the unitary space forming a housing, said floor means including a perforated belt of an endless loop, a rear wall attached to said perforated belt;
    guide means operatively mounted on said frame for operatively, longitudinally guiding said endless loop on said frame;
    a manure channel is mounted on the frame underneath each floor means and is adpated to receive the bird droppings from the broilers disposed on said floor means above said manure channel,
    said perforated belt having an operative surface and being substantially coextensive with the bottom of said housing and having a cable for connecting its ends, said guide means guiding said perforated belt from an upper operative position to a lower inoperative position removed substantially 180° about said guide means whereby bird droppings remaining on the operative surface thereof drop onto said manure channel; and
    means for driving said loop in opposite directions to move said floor means in its own plane and into and out of said housing through one end thereof.

2. The battery as claimed in claim 1 wherein said endless loop comprises a belt section to lie immediately adjacent said one end of said broiler housing, outside said broiler housing between said front end wall and means forming part of said guide means, about which said belt section is deflected, when said floor means forming portion of said endless loop is fully entered into the broiler housing.

3. The battery as claimed in claim 1 wherein the guide means comprises upper guide rail sections for said perforated belt portion disposed in the plane of said floor means, lower guide rail sections for said perforated belt portion disposed in a lower plane and arcuate guide rail sections adjacent said one end of said broiler housing for deflecting said perforated belt portion out of the plane of said floor means into said lower plane, the upper guide rail sections supporting said perforated belt portion in its floor forming position in the broiler housing.

4. The battery as claimed in claim 1 further including a rear end wall for said unitary space, said rear end wall being permanently attached to said floor means and movable therewith between said side walls when the floor means is moved into and out of said housing, said front end wall being removably attached to said frame.

5. The battery as claimed in claim 4 wherein said endless loop comprises a belt section to lie immediately adjacent said one end of said broiler housing, outside said broiler housing between said front end wall and means forming part of said guide means, about which said belt section is deflected, when said floor means forming portion of said endless loop is fully entered into the broiler housing.

6. The battery as claimed in claim 4 wherein the endless loop being guided by said guide means into substantially parallel upper and lower runs beneath said broiler housing, the cable occupying the lower run when said floor means for the broilers is wholly within the broiler housing.

7. The battery as claimed in claim 6 wherein said guide means comprises a guide roller for said endless loop, said guide roller being mounted on said frame adjacent said one end of said broiler housing and, mounted on said frame adjacent the opposite end of said broiler housing, a drive shaft, and a reversible drive connected to drive said drive shaft, there being a guide pulley for said cable mounted on said drive shaft to drive said cable thereby to drive said endless loop to move said floor means into and out of said broiler housing as aforesaid.

8. The battery as claimed in claim 1 wherein the endless loop being guided by said guide means into substantially parallel upper and lower runs beneath said housing, the cable occupying the lower run when said floor means for the broilers is wholly within the broiler housing, said manure channel being positioned beneath said lower run.

9. The battery as claimed in claim 8 wherein said guide means comprises a guide roller for said endless loop, said guide roller being mounted on said frame adjacent said one end of said broiler housing and, mounted on said frame adjacent the opposite end of said broiler housing, a drive shaft, and a reversible drive connected to drive said drive shaft, there being a guide pulley for said cable mounted on said drive shaft to drive said cable thereby to drive said endless loop to move said floor means into and out of said broiler housing as aforesaid.

10. The battery as claimed in claim 8 further including a cleaning device for the perforated belt portion disposed below the lower run of said endless loop and adjacent said one end of said housing.

11. The battery as claimed in claim 8 wherein said endless loop further comprises a belt section to lie immediately adjacent said one end of said broiler housing, outside said broiler housing between said front end wall and means forming part of said guide means, about which said belt section is deflected, when said floor means forming portion of said endless loop is fully entered into the broiler housing.

12. The battery as claimed in claim 11 wherein said means forming part of said guide means comprises a guide roller for said endless loop, said guide roller being mounted on said frame adjacent said one end of said broiler housing and, mounted on said frame adjacent the opposite end of said broiler housing, a drive shaft, and a reversible drive connected to drive said drive shaft, there being a guide pulley for said cable mounted on said drive shaft to drive said cable thereby to drive said endless loop to move said floor means into and out of said broiler housing as aforesaid.

13. A battery for rearing broilers including a frame, opposite side walls and a front end movable wall attached to said frame and in part defining a unitary space which is to act as broiler quarters, a floor for the broiler quarters, said floor being formed by a perforated belt portion of an endless loop, guide means mounting said endless loop on said frame, and means for driving said loop in opposite directions to move said floor, in its own plane, into and out of broiler quarters through one end thereof, a rear wall attached to said perforated belt, the guide means comprises two upper guide rail sections, said perforated belt portion being disposed in the plane of said floor, two lower guide rail sections for said perforated belt portion disposed in a lower plane and two arcuate guide rail sections adjacent said one end of said broiler quarters for deflecting said perforated belt portion out of the plane of said floor into said lower plane, the upper guide rail sections supporting said perforated belt portion in its floor forming position in the broiler quarters, the perforated belt portion has transverse pockets on the inside of the loop, and stiffening rods are provided disposed one in each of said pockets, said rods projecting from said pockets at the two ends thereof disposed at the respective longitudinal side edges of the perforated belt portion, each of said rods mounting a pair of freely rotatable rollers at their two ends respectively, said guide rail sections supporting and guiding said rollers when said floor is moved into and out of said broiler quarters through said one end thereof.

14. A battery as claimed in claim 13 wherein the transverse pockets comprise marginal flanges by means of which the pockets are secured to the perforated belt portion and the pockets are secured to the perforated belt portion in regions free of holes.

15. A battery as claimed in claim 13 wherein the guide rail sections are secured to the frame by brackets which also support food troughs extending one along each of the longitudinal sides of the frame.

16. A battery as claimed in claim 13 wherein a roller cover carried by the frame engages over each of said upper guide rail sections and reaches directly to the plane of the floor.

17. The battery as claimed in claim 13 further including a rear end wall attached to said frame, a drinking water supply pipe mounted for vertical height adjustment on said frame so as to extend through vertical gaps in said front and rear end walls and through said housing parallel to said opposite side walls and the floor thereof, and said gaps are closed by combs having flexible teeth of elastomeric material located in the gaps.

18. The battery as claimed in claim 13 wherein said perforated belt portion is provided with holes of about 15 mm in diameter, the holes being spaced apart by about 8 mm.

19. The battery as claimed in claim 13 wherein said floor for said broiler quarters is formed by said perforated belt portion while occupying a stationary position in an upper run of said endless loop, the endless loop is deflected about a guide roller forming part of said guide means at a location adjacent said one end of said housing, and a transverse conveyor is provided adjacent said guide roller at substantially the height of said floor.

20. The battery as claimed in claim 19 wherein the transverse conveyor is adjustable in height so as to be positionable adjacent different guide rollers associated with different tiers of a multi-tier battery each tier of which provides housing defined in a unitary space having a floor formed by a perforated belt portion of an endless loop guided by the roller.

21. A method of rearing broilers including placing chicks on a loading table formed at one end of an upper run of an endless conveying loop by a perforated belt portion of the loop as the loop is driven in a direction to carry the chicks placed on said perforated belt portion towards the opposite end of said upper run and between an opposite pair of said walls of rearing quarters of which the perforated belt portion is to form the floor, said perforated belt portion carrying a rear end wall for said quarters, stopping the motion of the endless belt, fixing a front end wall on said quarters, feeding and watering the chicks and collecting the droppings falling through the perforations in said perforated belt portion in a manure channel disposed below a cable portion of said endless loop forming at least part of the lower run of the loop, and then removing said front end wall and driving said endless loop in the opposite direction to carry the fattened broilers out of the rearing quarters.

22. A method as claimed in claim 21 wherein the fattened broilers are delivered from the endless conveying loop onto a transverse conveyor disposed at said one end of the upper run of the endless conveying loop substantially at the same height as the upper run of the loop.

23. A method as claimed in claim 21 including cleaning the foor surface of said perforated belt portion of the endless loop at a cleaning station positioned in the lower run of the endless conveying loop adjacent said one end of the upper run whilst the loop is being driven to carry the fattened broilers out of the rearing quarters.

* * * * *